(12) United States Patent
Chang

(10) Patent No.: US 8,651,257 B2
(45) Date of Patent: Feb. 18, 2014

(54) DRIVING STRUCTURE FOR A WHEEL HUB OF A BICYCLE

(76) Inventor: Bin Chang, Taichung (TW)

( * ) Notice: Subject to any disclaimer, the term of this patent is extended or adjusted under 35 U.S.C. 154(b) by 88 days.

(21) Appl. No.: 13/531,595

(22) Filed: Jun. 25, 2012

(65) Prior Publication Data

US 2013/0341146 A1 Dec. 26, 2013

(51) Int. Cl.
*F16D 23/00* (2006.01)
(52) U.S. Cl.
USPC ............................................................ 192/64
(58) Field of Classification Search
USPC .................... 192/64, 30 R, 41 R, 31, 45.1
See application file for complete search history.

(56) References Cited

U.S. PATENT DOCUMENTS

| 5,632,364 | A * | 5/1997 | Mercat ............................ 192/64 |
| 6,588,564 | B1 * | 7/2003 | Jager et al. ..................... 192/64 |
| 7,562,755 | B2 * | 7/2009 | Spahr .............................. 192/64 |
| 2004/0112703 | A1 * | 6/2004 | Kremer .......................... 192/46 |

* cited by examiner

*Primary Examiner* — David D Le
*Assistant Examiner* — David J Hlavka

(57) ABSTRACT

A driving structure for a wheel hub of a bicycle includes a wheel hub having a ratchet wheel, a ratchet base having an operating member and connected to the wheel hub, an engaging block and an elastic member both assembled onto the operating member, the elastic member abutting against the engaging block so that the engaging block is engaged with the ratchet wheel, a rotating ring assembled between the ratchet wheel and the operating member and having a plurality of abutting plates, each abutting plate abutting against the corresponding engaging block, an elastomer defined on the operating member and abutting against the rotating ring. Under this arrangement, the ratchet wheel simultaneously engages with the engaging blocks, because of the rotating ring and the elastomer.

3 Claims, 5 Drawing Sheets

DRIVING STRUCTURE FOR A WHEEL HUB OF A BICYCLE

BACKGROUND OF THE INVENTION

1. Field of the Invention

The present invention relates to a driving structure and more particularly to a driving structure for a wheel hub of a bicycle.

2. Description of Related Art

Bicycle activity is more and more popular in the 21st century because bicycle activity is eco-friendly, convenient and entertaining. Many enterprises encourage their employees to go to work by bicycles instead of driving vehicles today. Many people also go shopping or go traveling by bicycles during their leisure time. Because a wheel hub of a bicycle is very important for the comfort of riding, a conventional driving structure for a wheel hub of a bicycle comes to the world.

The conventional driving structure for a wheel hub of a bicycle comprises a wheel hub and a ratchet base, the wheel hub having a ratchet wheel defined at one end thereof, the ratchet wheel having a plurality of teeth defined around an inner side thereof, the ratchet base having an operating member defined at one end thereof, the wheel hub connected to the ratchet base so that the operating member of the ratchet base is enclosed by the ratchet wheel of the wheel hub, a plurality of pivoting grooves defined around an outer periphery of the operating member, an engaging block having an engaging part and a pivoting part at two ends thereof, the engaging block pivoted on one end of each pivoting groove via the pivoting part, an elastic member being set into another end of each pivoting groove, the engaging part of the engaging block exposed from the pivoting groove toward the teeth of the ratchet wheel, the elastic member abutting against the engaging part so that the engaging part of the engaging block is engaged with the teeth of the ratchet wheel in only one direction.

Under this arrangement, when the ratchet base is clockwise rotated relative to the ratchet wheel of the wheel hub, the teeth of the ratchet wheel engage with the engaging parts of the engaging blocks because each elastic member abuts against the corresponding engaging block toward the teeth of the ratchet wheel. As a result, the wheel hub is rotated by the rotation of the ratchet base. In contrast, when the ratchet wheel of the wheel hub is clockwise rotated relative to the ratchet base, the teeth of the ratchet wheel disengage from the engaging parts of the engaging blocks because the engaging part is engaged with the teeth of the ratchet wheel in only one direction. As a result, the ratchet base is not rotated by the rotation of the wheel hub.

Therefore, when a user is riding, the wheel hub of the bicycle still rotates smoothly even though the user does not tread on a pedal of a bicycle.

However, the conventional driving structure for a wheel hub of a bicycle still has one disadvantage as following:

The recovery force of one elastic member might be different from the other elastic member so that the teeth of the ratchet wheel cannot simultaneously engage with the engaging parts of the engaging blocks when the ratchet base is clockwise rotated relative to the ratchet wheel of the wheel hub. Therefore, one engaging part which is always firstly engaged with the teeth of the ratchet wheel would be quickly broken.

The present invention has arisen to mitigate and/or obviate the disadvantages of the conventional. Further benefits and advantages of the present invention will become apparent after a careful reading of the detailed description with appropriate reference to the accompanying drawings.

SUMMARY OF THE INVENTION

The main objective of the present invention is to provide an improved driving structure.

To achieve the objective, a driving structure for a wheel hub of a bicycle comprises a wheel hub having a ratchet wheel defined at one end thereof, the ratchet wheel having a plurality of teeth defined around an inner side thereof, a ratchet base having an operating member defined at one end thereof, the wheel hub connected to the ratchet base so that the operating member of the ratchet base is enclosed by the ratchet wheel of the wheel hub, a plurality of pivoting grooves defined around an outer periphery of the operating member, an engaging block having an engaging part and a pivoting part at two ends thereof, the engaging block pivoted on one end of each pivoting groove via the pivoting part, an elastic member being set into another end of each pivoting groove, the engaging part of the engaging block exposed from the pivoting groove toward the teeth of the ratchet wheel, the elastic member abutting against the engaging part so that the engaging part of the engaging block is engaged with the teeth of the ratchet wheel, at least one abutting groove defined on the outer periphery of the operating member, the abutting groove located between the two adjacent pivoting grooves, a rotating ring assembled between the ratchet wheel and the operating member, a plurality of abutting plates defined around the rotating ring, the abutting plates respectively corresponding to the engaging blocks, each abutting plate abutting against the corresponding engaging block, the rotating ring having an abutting rib, the abutting rib inserted into the abutting groove, an elastomer received in the abutting groove, one end of the elastomer abutting against a wall of the abutting groove, another end of the elastomer abutting against the abutting rib. Wherein, one end of one abutting plate is bent toward a center of the rotating ring so as to be defined as the abutting rib; an opening groove is defined between each two adjacent abutting plates; the opening groove is corresponding to the corresponding engaging block; the engaging part of each engaging block is exposed from the corresponding opening groove so as to be engaged with the teeth of the ratchet wheel.

Under this arrangement, when the ratchet base is clockwise rotated relative to the ratchet wheel of the wheel hub, the teeth of the ratchet wheel simultaneously engage with the engaging parts of the engaging blocks and the abutting rib of the rotating ring compresses against the elastomer; in contrast, when the ratchet wheel of the wheel hub is clockwise rotated relative to the ratchet base, the teeth of the ratchet wheel simultaneously disengage from the engaging parts of the engaging blocks and a recovery force of the elastomer compresses against the abutting rib of the rotating ring.

Further benefits and advantages of the present invention will become apparent after a careful reading of the detailed description with appropriate reference to the accompanying drawings.

DETAILED DESCRIPTION OF THE INVENTION

Figure 1:
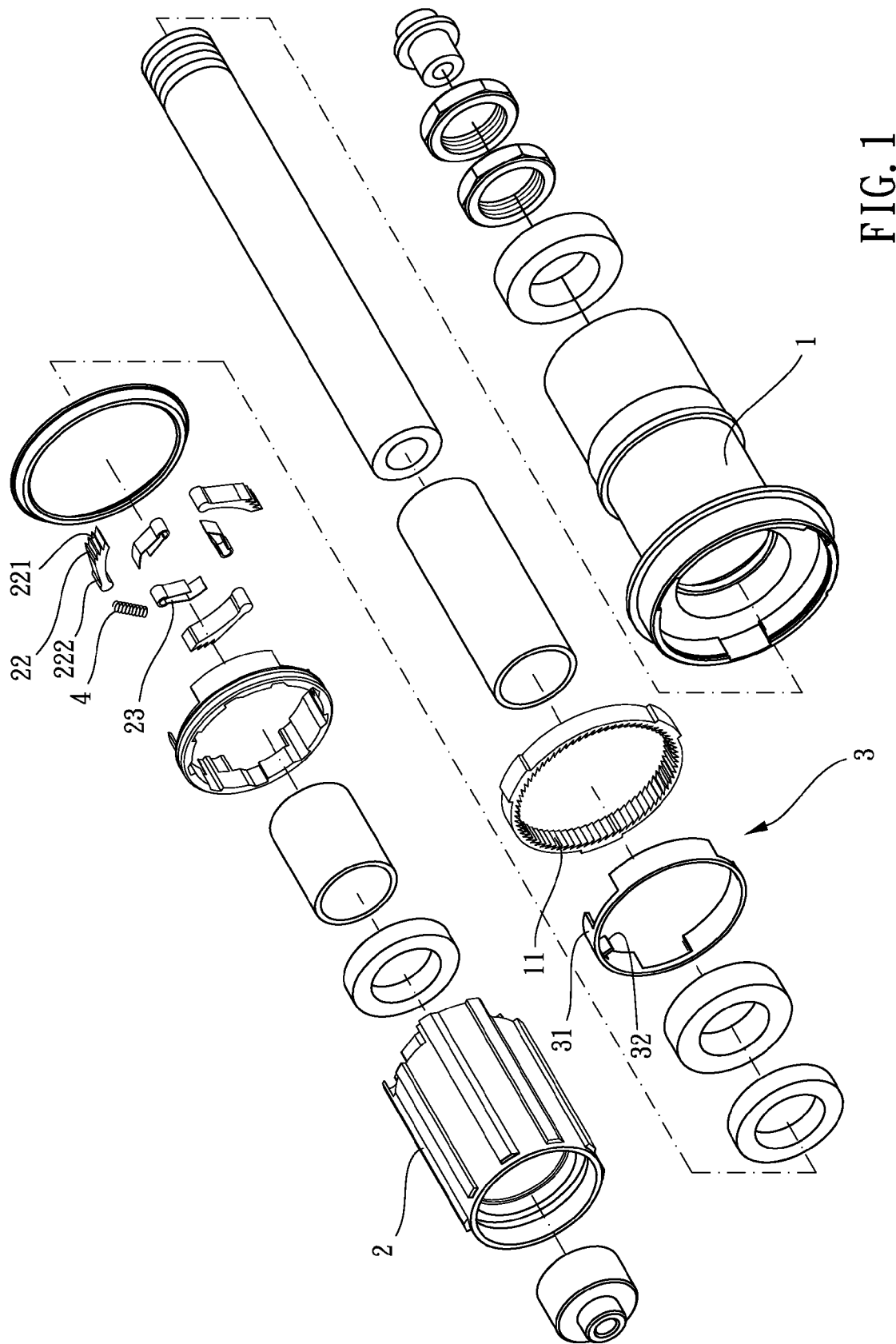
FIG. 1 is an exploded view of a driving structure for a wheel hub of a bicycle of the present invention.
Figure 2:
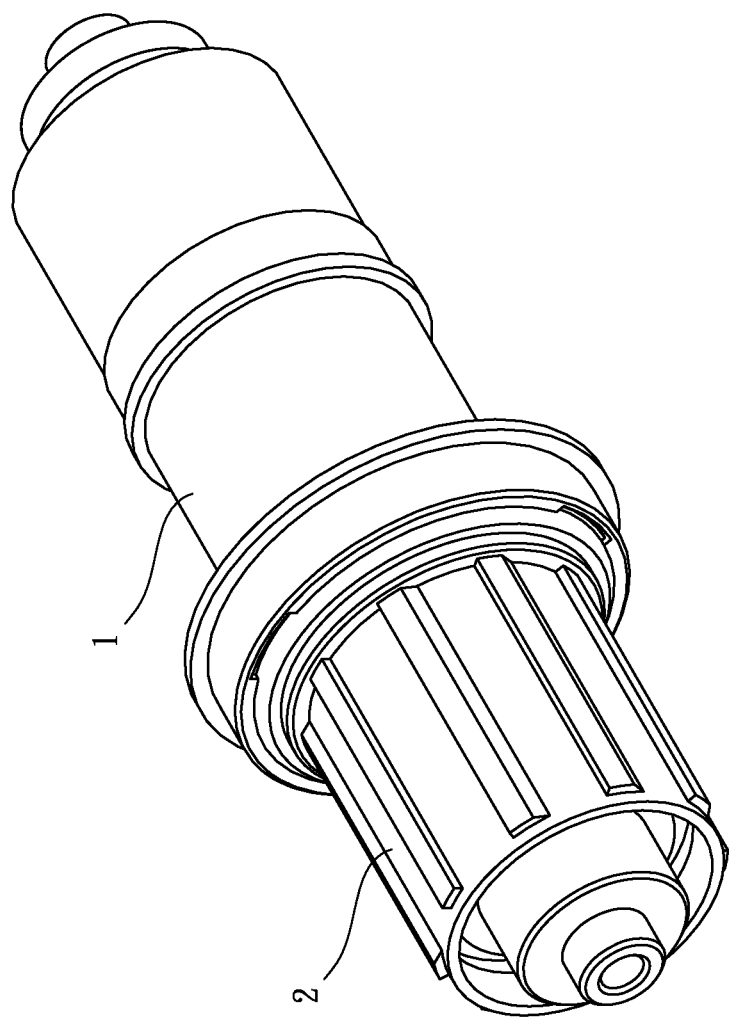
FIG. 2 is a perspective view of the driving structure for a wheel hub of a bicycle.
Figure 3:
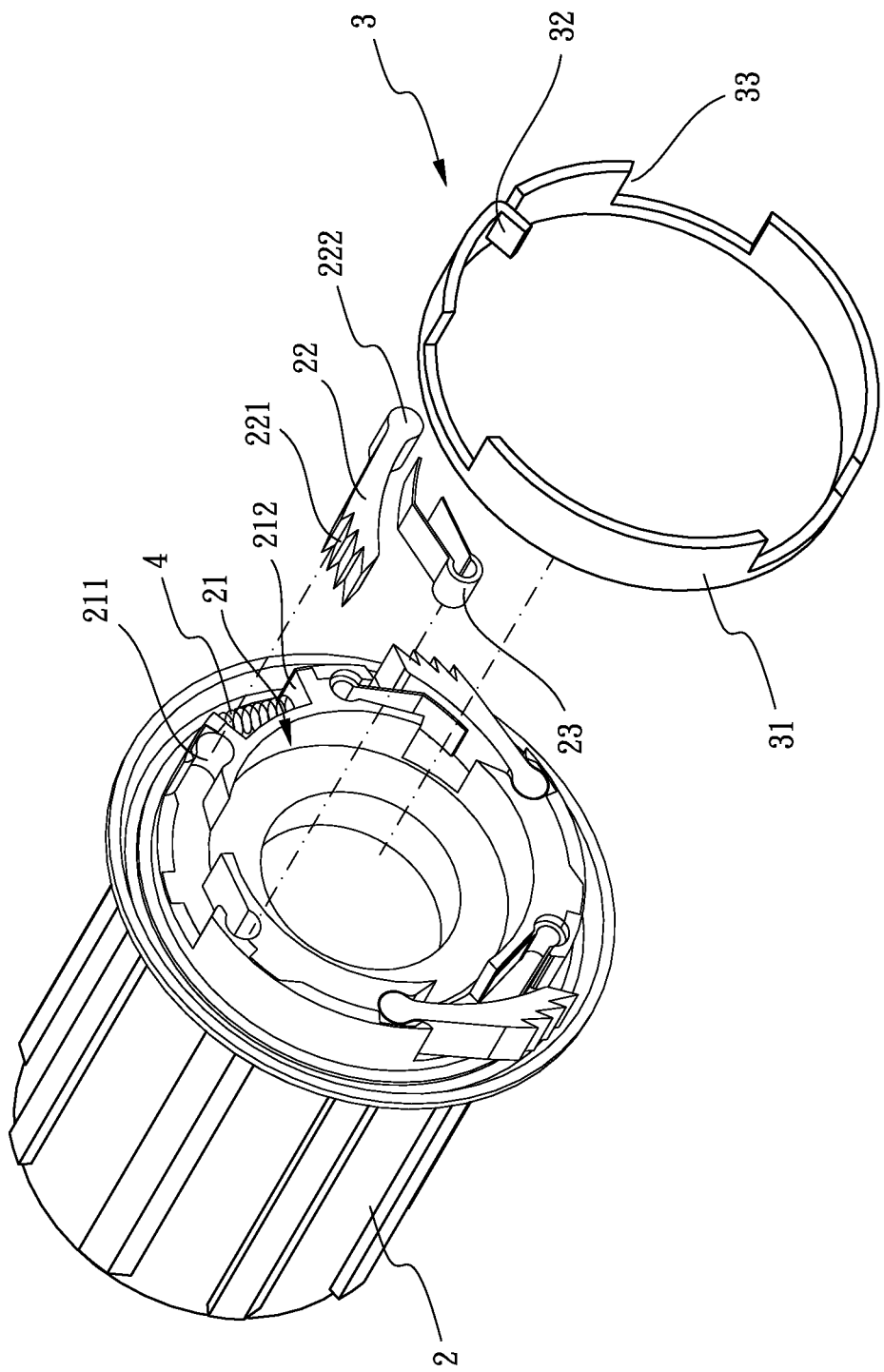
FIG. 3 is a partially exploded view of the driving structure for a wheel hub of a bicycle.

Referring to FIGS. 1-3, a driving structure for a wheel hub of a bicycle in accordance with the present invention comprises a wheel hub 1, a ratchet base 2, a rotating ring 3 and an elastomer 4. The wheel hub 1 has a ratchet wheel 11 defined at one end thereof. The ratchet wheel 11 has a plurality of teeth defined around an inner side thereof.

The ratchet base 2 has an operating member 21 defined at one end thereof. The wheel hub 1 is connected to the ratchet base 2 so that the operating member 21 of the ratchet base 2 is enclosed by the ratchet wheel 11 of the wheel hub 1. A plurality of pivoting grooves 211 is defined around an outer periphery of the operating member 21 (there are three pivoting grooves 211 equidistantly defined around the outer periphery of the operating member 21 in this embodiment of the present invention.). An engaging block 22 has an engaging part 221 and a pivoting part 222 at two ends thereof. The engaging block 22 is pivoted on one end of each pivoting groove 211 via the pivoting part 222. An elastic member 23 is set into another end of each pivoting groove 211. The engaging part 221 of the engaging block 22 is exposed from the pivoting groove 211 toward the teeth of the ratchet wheel 11. The elastic member 23 abuts against the engaging part 221 so that the engaging part 221 of the engaging block 22 is engaged with the teeth of the ratchet wheel 11. At least one abutting groove 212 is defined on the outer periphery of the operating member 21. The abutting groove 212 is located between the two adjacent pivoting grooves 211.

The rotating ring 3 is assembled between the ratchet wheel 11 and the operating member 21. A plurality of abutting plates 31 is defined around the rotating ring 3. The abutting plates 31 are respectively corresponding to the engaging blocks 22 (there are three abutting plates 31 equidistantly defined around the rotating ring 3 in this embodiment of the present invention.). Each abutting plate 31 abuts against the corresponding engaging block 22. The rotating ring 3 has an abutting rib 32. The abutting rib 32 is inserted into the abutting groove 212.

The elastomer 4 is received in the abutting groove 212. One end of the elastomer 4 abuts against a wall of the abutting groove 212. Another end of the elastomer 4 abuts against the abutting rib 32 (as shown in FIGS. 3-4).

Figure 4:
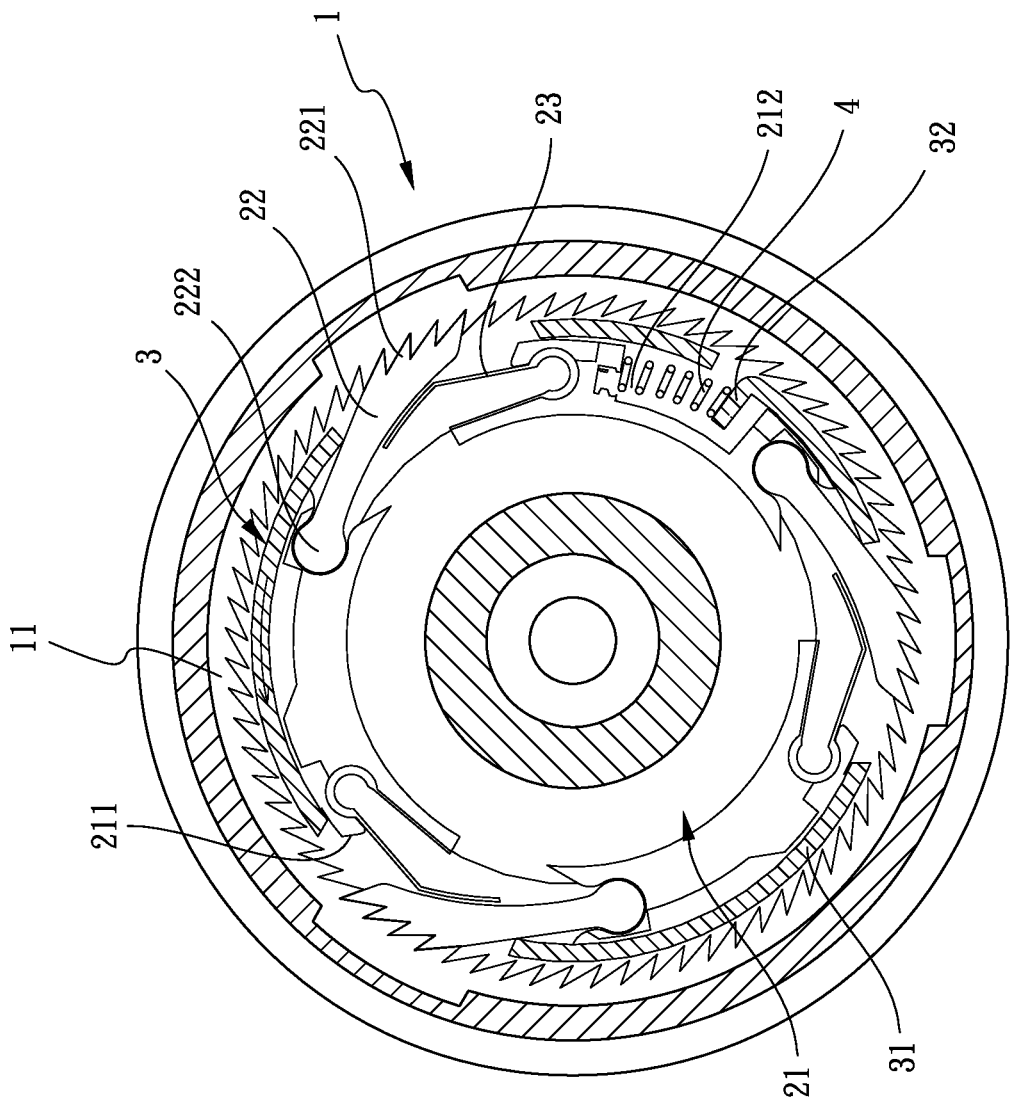
FIG. 4 is a cross-sectional view for showing a ratchet base which is clockwise rotated relative to a wheel hub.

Under this arrangement, when the ratchet base 2 is clockwise rotated relative to the ratchet wheel 11 of the wheel hub 1, the teeth of the ratchet wheel 11 simultaneously engage with the engaging parts 221 of the engaging blocks 22 to counterclockwise rotate each engaging block 22 so that each engaging block 22 counterclockwise compresses against the abutting plates 31 of the rotating ring 3; thereafter, the rotating ring 3 is counterclockwise rotated by the compression of the engaging block 22; finally, the abutting rib 32 of the rotating ring 3 compresses against the elastomer 4 via the rotation of the rotating ring 3 (as show in FIG. 4).

Figure 5:
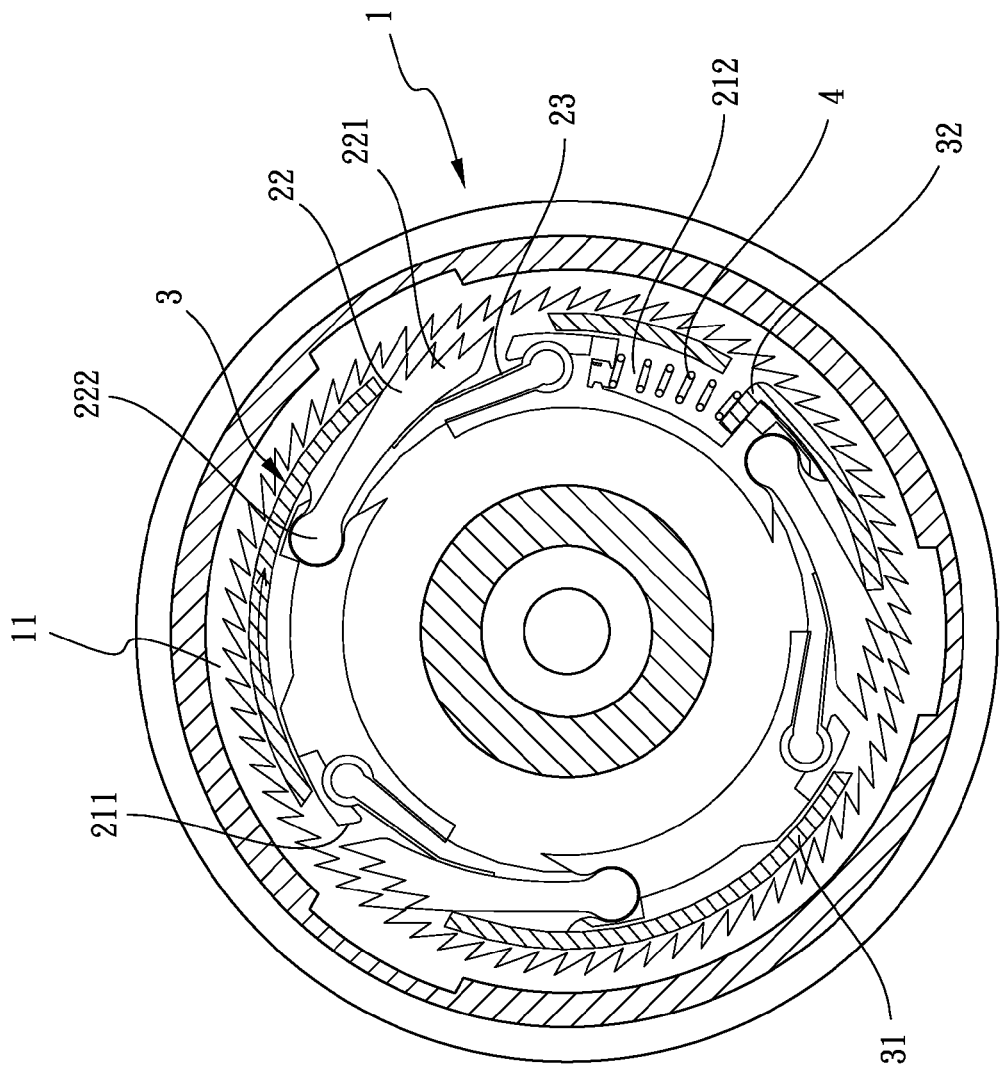
FIG. 5 is a cross-sectional view for showing the wheel hub which is clockwise rotated relative to the ratchet base.

In contrast, when the ratchet wheel 11 of the wheel hub 1 is clockwise rotated relative to the ratchet base 2, the teeth of the ratchet wheel 11 simultaneously disengage from the engaging parts 221 of the engaging blocks 22 to clockwise rotate each engaging block 22 so that each engaging block 22 clockwise compresses against the elastic member 23; thereafter, a recovery force of the elastomer 4 compresses against the abutting rib 32 of the rotating ring 3 to clockwise rotate the rotating ring 3; finally each abutting plate 31 of the rotating ring 3 abuts against the corresponding engaging block 22 (as show in FIG. 5).

Furthermore, one end of one abutting plate 31 is bent toward a center of the rotating ring 3 so as to be defined as the abutting rib 32. An opening groove 33 is defined between each two adjacent abutting plates 31. The opening groove 33 is corresponding to the corresponding engaging block 22. The engaging part 221 of each engaging block 22 is exposed from the corresponding opening groove 33 so as to be engaged with the teeth of the ratchet wheel 11.

All in all, when the ratchet base 2 is clockwise rotated relative to the ratchet wheel 11 of the wheel hub 1, although the recovery force of one elastic member 23 is different from the other elastic member 23, the teeth of the ratchet wheel 11 simultaneously engage with the engaging parts 221 of the engaging blocks 22 rather than non-simultaneously engage with the engaging parts 221 of the engaging blocks 22 as the prior art, because of the rotating ring 3 and the elastomer 4 of the present invention.

Although the invention has been explained in relation to its preferred embodiment, it is to be understood that many other possible modifications and variations can be made without departing from the spirit and scope of the invention as hereinafter claimed.

What is claimed is:

1. A driving structure for a wheel hub of a bicycle comprising:
 a wheel hub having a ratchet wheel defined at one end thereof, the ratchet wheel having a plurality of teeth defined around an inner side thereof;
 a ratchet base having an operating member defined at one end thereof, the wheel hub connected to the ratchet base so that the operating member of the ratchet base is enclosed by the ratchet wheel of the wheel hub, a plurality of pivoting grooves defined around an outer periphery of the operating member, an engaging block having an engaging part and a pivoting part at two ends thereof, the engaging block pivoted on one end of each pivoting groove via the pivoting part, an elastic member being set into another end of each pivoting groove, the engaging part of the engaging block exposed from the pivoting groove toward the teeth of the ratchet wheel, the elastic member abutting against the engaging part so that the engaging part of the engaging block is engaged with the teeth of the ratchet wheel, at least one abutting groove defined on the outer periphery of the operating member, the abutting groove located between the two adjacent pivoting grooves;
 a rotating ring assembled between the ratchet wheel and the operating member, a plurality of abutting plates defined around the rotating ring, the abutting plates respectively corresponding to the engaging blocks, each abutting plate abutting against the corresponding engaging block, the rotating ring having an abutting rib, the abutting rib inserted into the abutting groove; and
 an elastomer received in the abutting groove, one end of the elastomer abutting against a wall of the abutting groove, another end of the elastomer abutting against the abutting rib;
 wherein, when the ratchet base is clockwise rotated relative to the ratchet wheel of the wheel hub, the teeth of the ratchet wheel simultaneously engage with the engaging parts of the engaging blocks and the abutting rib of the rotating ring compresses against the elastomer; in contrast, when the ratchet wheel of the wheel hub is clockwise rotated relative to the ratchet base, the teeth of the ratchet wheel simultaneously disengage from the engaging parts of the engaging blocks and a recovery force of the elastomer compresses against the abutting rib of the rotating ring.

2. The driving structure for a wheel hub of a bicycle as claimed in claim 1, wherein one end of one abutting plate is bent toward a center of the rotating ring so as to be defined as the abutting rib.

3. The driving structure for a wheel hub of a bicycle as claimed in claim 1, wherein an opening groove is defined between each two adjacent abutting plates; the opening groove is corresponding to the corresponding engaging block; the engaging part of each engaging block is exposed from the corresponding opening groove so as to be engaged with the teeth of the ratchet wheel.

* * * * *